Jan 6, 1931.  R. N. FALGE  1,787,443
STOP AND BACK-UP LAMP
Filed March 7, 1928
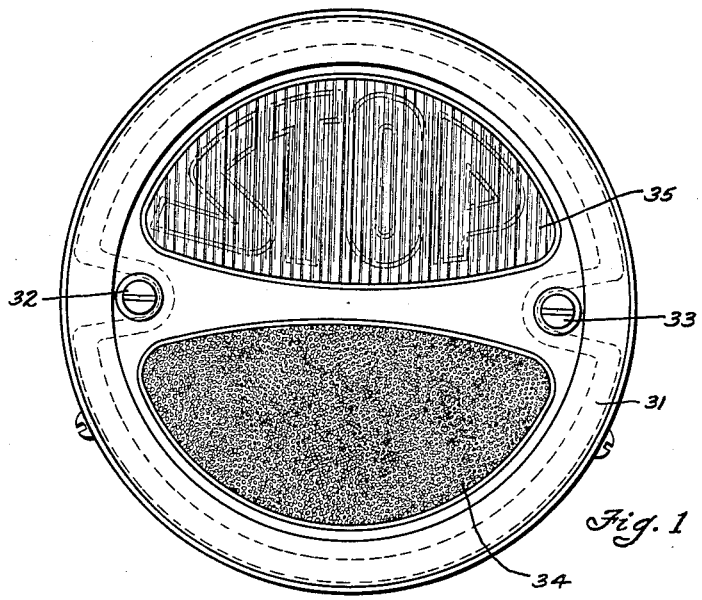
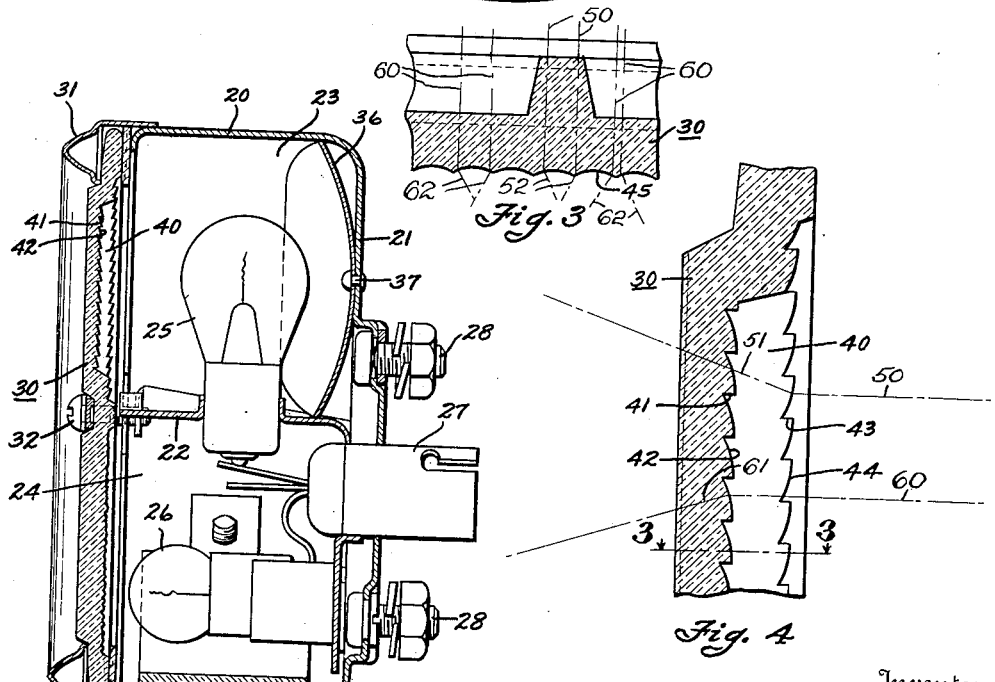

Patented Jan. 6, 1931

1,787,443

UNITED STATES PATENT OFFICE

ROBERT N. FALGE, OF DETROIT, MICHIGAN, ASSIGNOR TO GENERAL MOTORS RESEARCH CORPORATION, OF DETROIT, MICHIGAN, A CORPORATION OF DELAWARE

STOP AND BACK-UP LAMP

Application filed March 7, 1928. Serial No. 259,881.

This application is a continuation in part of applicant's prior application, Serial No. 216,533, filed August 31, 1927, and subsequently abandoned.

This invention relates to a lens for a rear signal lamp adapted to be used on a motor vehicle.

It is among the objects of the present invention to provide a lens adapted to transmit light rays to provide a warning signal and to illuminate the road bed over which the vehicle may be reversely operated.

Further objects and advantages of the present invention will be apparent from the following description, reference being had to the accompanying drawings, wherein a preferred embodiment of one form of the present invention is clearly shown.

In the drawings:

Fig. 1 is a front elevation of the signal lamp in which the lens is used.

Fig. 2 is a vertical sectional view taken through the center of Fig. 1, certain portions being shown in elevation for the sake of clearness.

Fig. 3 is a fragmentary sectional view taken horizontally through a portion of the lens substantially on the line 3—3 of Fig. 4.

Fig. 4 is a fragmentary, vertical sectional view of a portion of the lens taken through one of the depressions forming a letter of the legend.

Referring to the drawings, the numeral 20 designates a housing of the lamp which is cup-shaped, providing a rear wall 21. A partition 22 divides the interior of the lamp housing into two compartments 23 and 24. Partition 22 supports a lamp 25 within the compartment 23, and another lamp 26 within the compartment 24. A connector plug 27 extending through an aperture in the rear wall connects the two lamps 25 and 26 with a source of current, not shown. Mounting studs 28 are carried by the rear wall 21 and provide means for mounting the lamp in position in the rear of the vehicle. A translucent lens 30 forms a cover for the open end of the housing 20, said lens being carried by a frame member 31 which fits over the open end of the housing 20 and is secured to said housing by means of screws 32 and 33 which screw-threadedly engage ears provided on the partition 22.

The lens 30 comprises the tail light portion 34 and the warning signal portion 35. The tail light portion 34 is illuminated by the lamp 26. The warning signal portion 35 is illuminated by the lamp 25, the rays thereof being projected through said lens portion 35 by reflector 36 which is positioned behind the lamp 25 and secured to the rear wall 21 by a rivet 37. The lens portion 35 has its front surface provided with a plurality of concavo-cylindrical flutes 45, arranged vertically, these flutes tending to spread the light rays coming through the lens, sidewise for general illumination as indicated in Fig. 3. The rear surface, or more specifically the inside surface of the lens, is provided with depressions 40 which form the letters of the legend "Stop". The inner surfaces of these depressions are provided with transverse ribs 41 spaced, and having curved surfaces 42 which are adapted to refract light from the original path of projection by the reflector, in a downward direction when the lens is in position in the lamp, and the latter is secured to the vehicle. The surface of the lens surrounding the depressions is provided with spaced, transverse ribs 43 having curved surfaces 44 which are supplementarily arranged with respect to the ribs 41 in the depressions, and which are adapted to refract light in a direction opposite to that refracted by the curved surfaces 42 of the ribs in the depressions as will be seen upon reference to Fig. 4. The comparatively thinner portions of the lens, provided by the depressions therein, are less opaque than the comparatively thicker, surrounding portions so that the light rays passing through said thicker portions will be more subdued than those passing through the thinner lens portions adjacent the letters. The contrast between the rays of light passing through these two portions will distinctly bring out the legend "Stop". The more brilliant rays of light transmitted by the thinner lens portions are directed downwardly for two reasons; first, to avoid blinding and glaring light rays from reaching the eye level of the driver of the following vehicle, and second, to substantially illuminate the road bed to the rear of the vehicle to facilitate its reverse operation. The less brilliant rays from the thicker portions of the lens may safely be directed to the eye level of the driver of the following vehicle, to flash a warning signal without affecting his vision. The concavo-cylindrical flutes designated by the numeral 45 spread sidewise in both directions, both the downwardly and upwardly directed light rays.

These features of the lens 35 are shown by reference to Figs. 3 and 4, in which is shown the path of a light ray indicated by the line 50 striking the curved surface 44 of a rib 43 and being deflected upwardly as appears in Fig. 4, and indicated at 51, and thence through the body of the lens 35 until the ray strikes the surface of one of the cylindrical flutes 45, where it is laterally deflected as at 52, depending upon the portion of the curved surfaces that it is directed upon, as will appear upon reference to Fig. 3. The path of a light ray passing through the signal portion of the lens is indicated by the line 60, which, when striking the curved surface 42 of the prism 41, is deflected downwardly, as indicated at 61, Fig. 4, and thence through the body of the lens to the cylindrical surface of one of the vertical flutes 45, where it is deflected laterally as at 62, similiar to the lateral deflection of ray 50. Thus, it is seen that the light rays are deflected into two planes in their passage through the lens, first in a vertical plane, by reason of the supplementarily arranged prismatic ribs 41 and 43, and thence in a horizontal plane, by reason of the vertically deflected rays passing through the cylindrically surfaced flutes 45.

The present invention, therefore, provides a lens which upon being illuminated will distinctly show the legend "Stop" as a warning signal in such a manner that no blinding rays are directed to the eye level of the operator of a following vehicle, and at the same time provides substantial illumination of the road bed to facilitate rearward operation of the vehicle.

While the form of embodiment of the present invention as herein disclosed, constitutes a preferred form, it is to be understood that other forms might be adopted, all coming within the scope of the claims which follow.

What is claimed is as follows:

1. A lens for a signal lamp comprising, depressions in one surface of the lens, presenting the letters of a legend and having prisms, the thicker cross sectional areas of which are beneath the thinner areas whereby said prisms will refract light rays in a downwardly direction, and prisms on the lens surrounding the letters of the legend, said prisms having their thicker cross sectional areas above the thinner areas whereby said prisms will refract light rays in an upward direction.

2. A lens for a signal lamp comprising, depressions in the one surface of the lens, which form the letters of a legend, the bottom surface of said depressions having spaced prisms each having a cross section corresponding substantially to the arc of the upper right quadrant of a circle, the surface of the lens surrounding the depressions having spaced prisms each having a cross section corresponding to the arc of the lower right quadrant of a circle.

3. A lens for stop lights and the like comprising indicia bearing portions and a background portion, both of said portions being provided with horizontal prisms, the prisms on one of said portions having their apices extending upwardly and the prisms on the other of said portions having their apices extending downwardly.

4. A lens for stop lights and the like comprising indicia bearing portions and a background portion, said portions being of different thickness to vary the intensity of the light transmitted, said portions being provided with horizontal prisms, the prisms on one of said portions having their apices extending upwardly and the prisms on the other of said portions having their apices extending downwardly.

5. A lens for a signal lamp comprising depressions in one surface of the lens which form the letters of a legend, the bottom surface of the depressed portions and surrounding surface of the lens having horizontal prisms formed thereon, the prisms on the depressed portions having their apices extending in a direction opposite to that in which the apices of the prisms on the surrounding surface extend, to deflect light rays from their original paths of projection in opposite directions respectively.

In testimony whereof I hereto affix my signature.

ROBERT N. FALGE.